T. PEARSON.
GRATE.
APPLICATION FILED JUNE 18, 1918.
1,324,689.
Patented Dec. 9, 1919.
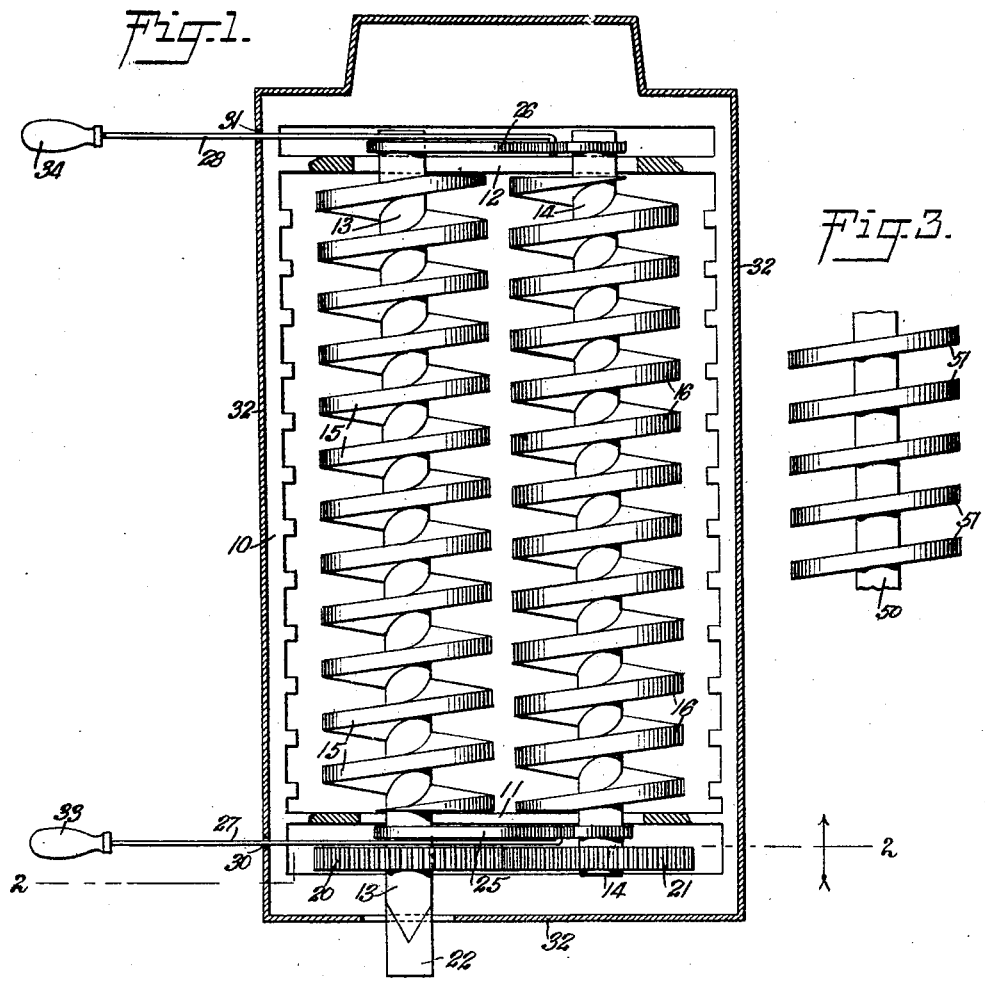
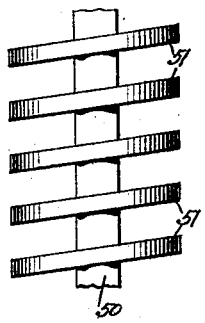
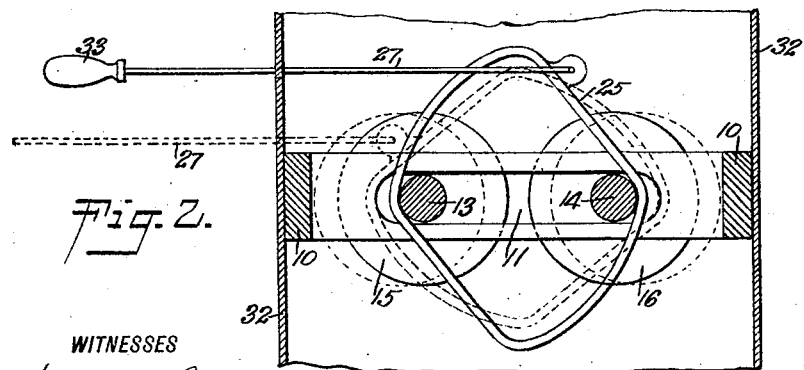
WITNESSES
INVENTOR
Thomas Pearson
BY
ATTORNEYS

UNITED STATES PATENT OFFICE.

THOMAS PEARSON, OF SYRACUSE, NEW YORK.

GRATE.

1,324,689.  Specification of Letters Patent.  Patented Dec. 9, 1919.

Application filed June 18, 1918. Serial No. 240,641.

*To all whom it may concern:*

Be it known that I, THOMAS PEARSON, a citizen of the United States, and a resident of Syracuse, in the county of Onondaga and State of New York, have invented a new and Improved Grate, of which the following is a full, clear, and exact description.

The invention relates to furnaces, stoves, ranges and like devices using coal, wood or like combustible material as a fuel.

The object of the invention is to provide a new and improved grate arranged to permit of conveniently and quickly agitating burning fuel with a view to keep the same free of ashes and to insure complete combustion. Another object is to permit of readily crushing any clinkers without violently disturbing the burning fuel. Another object is to permit convenient dumping of the burning fuel whenever it is desired to do so.

With these and other objects in view the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a plan view of the grate with the fire pot shown in section;

Fig. 2 is a sectional side elevation of the same on the line 2—2 of Fig. 1; and

Fig. 3 is a plan view of a modified form of the grate.

The frame 10 of the fire pot is provided near the front and rear ends with elongated bearings or guideways 11 and 12 in which are journaled shafts 13 and 14 provided with circular grate members 15 and 16, preferably in the form of a screw thread which may be a right or a left-hand one. As shown in Fig. 1, the screw threads 15 and 16 are alike and form the support for the burning fuel. On the shafts 13 and 14 are secured gear wheels 20 and 21 normally in mesh with each other to rotate the two grate members in unison when one of the shafts is rotated. As shown in the drawings, the front end 22 of the shaft 13 is made polygonal for the application of a crank or other tool to permit the operator to conveniently turn the shaft 13 with a view to rotate both shafts 13 and 14 in unison. It is understood that the shafts 13 and 14 may be rotated continually or rotated intermittently forward or backward by the operator turning the crank arm correspondingly. For ordinary shaking purposes it is sufficient to give approximately a half turn to the crank. It is understood that on agitating the grate members the ashes are caused to travel lengthwise of the shafts to gradually dislodge the ashes and allow the same to fall down into the ash pit without violently disturbing the burning fuel.

Normally the two grate members are in close relation to each other, that is, in close relation side by side and with the gear wheels 20 and 21 in mesh with each other. When it is desired to dump the fuel, the two members are allowed to move apart and for this purpose the following arrangement is made: The shafts 13 and 14 extend within approximately rectangular frames 25 and 26 provided with rods 27 and 28 extending through vertical slots 30 and 31 formed in the casing 32 of the fire pot. The outer ends of the rods 27 and 28 are provided with suitable handles 33 and 34 under the control of the operator for imparting a turning movement to the frames 25 and 26. The frames 25 and 26 when in the normal position shown in Figs. 1 and 2 engage opposite frame corners which are nearest together thus holding the grate members 15 and 16 in close relation, and when a quarter turn is given to the frames 25 and 26 then the opposite corners farthest apart allow the shafts 13 and 14 to spread apart, that is, to move into dumping position with a view to allow the fuel to drop between the members down into the ash pit. After the dumping operation is repeated the frames 25 and 26 are returned to normal position with a view to move the grate members 15 and 16 into close relation and to re-engage the gear wheels 20 and 21 with each other.

Instead of the grate members 15 and 16 being in the form of a spiral thread or screw thread, as shown and described, the shaft 50 of each grate member may be provided with disks 51 set diagonally on the shaft and fastened thereto, as indicated in Fig. 3. In this case the grate members when rotated cause the ashes to be agitated lengthwise between adjacent disks to become loosened and to finally drop down into the ash pit.

It is understood that the dumping means shown and described may be dispensed with and a screw grate bar, such as shown in Fig. 1, may be used with a disk grate bar, such as shown in Fig. 3, to provide a pair of grate bars arranged one alongside the other.

Having thus described my invention, I claim as new and desire to secure by Letters Patent:—

1. A grate, comprising a pair of grate members arranged one alongside the other and each having a revoluble shaft, a screw member secured centrally to the shaft and rotating with the same, elongated bearings in which the said shafts are journaled to allow the shafts to move toward and from each other, and manually controlled means connected with the said shafts to move the same toward or from each other.

2. A grate, comprising a pair of grate members arranged one alongside the other and each having a revoluble shaft, a screw member secured centrally to the shaft and rotating with the same, elongated bearings in which the ends of the shafts are journaled, approximately rectangular frames engaging the said shafts to move the latter toward or from each other, and rods connected with the said frames to turn the latter, the frames in one position holding the shafts near each other and the frames in another position allowing the shafts to move apart into dumping position.

3. A grate, comprising a pair of grate members arranged one alongside the other and each having a revoluble shaft, a screw plate secured centrally to the shaft and rotating with the same, elongated bearings in which the ends of the shafts are journaled, rectangular frames engaging the said shafts to move the latter toward or from each other, rods connected with the said frames to turn the latter, the frames in one position holding the shafts near each other and the frames in another position allowing the shafts to move apart into dumping position, and gear wheels secured on the said shafts and in mesh with each other at the time the shafts are in near position.

THOMAS PEARSON.